(12) United States Patent
Wentzel et al.

(10) Patent No.: US 9,742,180 B2
(45) Date of Patent: Aug. 22, 2017

(54) POWER CABLE TERMINAL CONNECTION DEVICE

(71) Applicant: 3M INNOVATIVE PROPERTIES COMPANY, St. Paul, MN (US)

(72) Inventors: Carl J. Wentzel, Austin, TX (US); Christopher D. Sebesta, Austin, TX (US); Jaylon D. Loyd, Austin, TX (US); David V. Mahoney, Austin, TX (US); Michael D. Benson, Austin, TX (US); Levent Biyikli, Cedar Park, TX (US); Jens Weichold, Erkelenz (DE); Mark Gravermann, Erkelenz (DE); Giuliano Bolcato, Dugnano (IT)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/898,512

(22) PCT Filed: Jun. 19, 2014

(86) PCT No.: PCT/US2014/043137
§ 371 (c)(1),
(2) Date: Dec. 15, 2015

(87) PCT Pub. No.: WO2014/209739
PCT Pub. Date: Dec. 31, 2014

(65) Prior Publication Data
US 2016/0134094 A1  May 12, 2016

Related U.S. Application Data

(60) Provisional application No. 61/839,543, filed on Jun. 26, 2013.

(51) Int. Cl.
*H02G 15/02* (2006.01)
*H02G 1/14* (2006.01)
(Continued)

(52) U.S. Cl.
CPC ............. *H02G 15/02* (2013.01); *H01B 9/006* (2013.01); *H02G 1/14* (2013.01); *H02G 15/068* (2013.01)

(58) Field of Classification Search
CPC ....................................................... H01B 9/00
(Continued)

(56) References Cited

U.S. PATENT DOCUMENTS 3,515,798 A   6/1970  Sievert
4,135,553 A   1/1979  Evans
(Continued)

FOREIGN PATENT DOCUMENTS

CA       20131262     6/1991
CA        2107383     4/1994
(Continued)

OTHER PUBLICATIONS

International Search Report for PCT International Application No. PCT/US2014/043137 mailed on Oct. 10, 2014, 4 pages.
(Continued)

*Primary Examiner* — Timothy Thompson
*Assistant Examiner* — Michael F McAllister
(74) *Attorney, Agent, or Firm* — Gregg H. Rosenblatt

(57) ABSTRACT

A terminal connection device comprises a contiguous body disposed onto an inner conductor. The inner conductor includes a first end mateable with a power cable connector and a second end. The body comprises a multilayer structure having an inner conductive or semiconductive layer disposed over at least a portion of the power cable connector, an insulating layer and an outer conductive or semiconductive layer. The body surrounds the first end of the inner conductor and extending towards the second end of the inner conductor. The body can also include an electrically isolated section of conductive or semiconductive material. The ter-
(Continued)

minal connection device can be a fully integrated structure, having a pre-installed connection interface, or the terminal connection device can be configured as an adapter which can be mounted in the field to a connection interface.

16 Claims, 8 Drawing Sheets

(51) Int. Cl.
*H02G 15/068* (2006.01)
*H01B 9/00* (2006.01)

(58) Field of Classification Search
USPC .......................................................... 174/73.1
See application file for complete search history.

(56) References Cited

U.S. PATENT DOCUMENTS

| | | | |
|---|---|---|---|
| 4,179,320 A | 12/1979 | Midgley | |
| 4,314,093 A | 2/1982 | Eldridge | |
| 4,503,105 A | 3/1985 | Tomioka | |
| 4,585,607 A | 4/1986 | Krackeler | |
| 4,656,070 A | 4/1987 | Nyberg | |
| 4,822,952 A * | 4/1989 | Katz | H02G 15/064 |
| | | | 156/49 |
| 4,867,687 A | 9/1989 | Williams | |
| 4,963,819 A * | 10/1990 | Clarke | G01R 15/16 |
| | | | 174/73.1 |
| 5,051,733 A * | 9/1991 | Neuhouser | G01R 19/155 |
| | | | 174/73.1 |
| 5,098,752 A | 3/1992 | Chang | |
| 5,495,650 A | 3/1996 | Crepel | |
| 5,577,310 A | 11/1996 | Cheenne-Astorino | |
| 5,584,625 A | 12/1996 | Petri | |
| 5,747,744 A | 5/1998 | Kraft | |
| 5,821,459 A * | 10/1998 | Cheenne-Astorino | H02G 15/103 |
| | | | 174/73.1 |
| 6,031,368 A * | 2/2000 | Klippel | G01R 15/06 |
| | | | 324/126 |
| 6,045,373 A | 4/2000 | Hardt | |
| 6,176,659 B1 | 1/2001 | Hardt | |
| 6,333,462 B1 * | 12/2001 | Quaggia | H02G 15/068 |
| | | | 174/73.1 |
| 6,624,357 B2 * | 9/2003 | Cardinaels | H02G 15/1833 |
| | | | 174/73.1 |
| 6,843,685 B1 | 1/2005 | Borgstrom | |
| 7,230,411 B2 * | 6/2007 | Mulligan | G01R 15/16 |
| | | | 324/530 |
| 7,473,847 B2 | 1/2009 | Sainz De La Maza Escobal | |
| 7,503,785 B2 | 3/2009 | Stepniak | |
| 7,767,909 B2 * | 8/2010 | Krabs | H01R 4/726 |
| | | | 174/84 C |
| 7,878,849 B2 | 2/2011 | Hughes | |
| 7,958,631 B2 | 6/2011 | Hughes | |
| 8,461,824 B2 * | 6/2013 | Ausserlechner | G01R 15/207 |
| | | | 324/117 R |
| 8,602,800 B2 | 12/2013 | Borgstrom et al. | |
| 9,429,594 B2 * | 8/2016 | Bolcato | G01R 15/142 |
| 2005/0142941 A1 | 6/2005 | Borgstrom | |
| 2009/0258547 A1 | 10/2009 | Hughes | |
| 2009/0311920 A1 | 12/2009 | Robertson | |

FOREIGN PATENT DOCUMENTS

| | | |
|---|---|---|
| DE | 2939600 | 4/1981 |
| DE | 3611463 | 10/1987 |
| DE | 3702735 | 8/1988 |
| DE | 3709943 | 10/1988 |
| DE | 3813001 | 11/1989 |
| EP | 0044726 | 1/1982 |
| EP | 0291213 | 11/1988 |
| EP | 0399263 | 11/1990 |
| EP | 0435569 | 7/1991 |
| EP | 0470388 | 2/1992 |
| EP | 0500216 | 8/1992 |
| EP | 0541000 | 5/1993 |
| EP | 0692643 | 1/1996 |
| EP | 0716474 | 6/1996 |
| EP | 0819222 | 1/1998 |
| EP | 0966780 | 12/1999 |
| EP | 1010226 | 6/2000 |
| EP | 1391740 | 2/2004 |
| GB | 1058890 | 2/1967 |
| JP | 60-256068 | 12/1985 |
| JP | 1054369 | 3/1989 |
| JP | 1055009 | 3/1989 |
| JP | 11-41779 | 2/1999 |
| JP | 2002-330535 | 11/2002 |
| JP | 2007-135333 | 5/2007 |
| WO | WO 90-13933 | 11/1990 |
| WO | WO 95-11542 | 4/1995 |
| WO | WO 95-25229 | 9/1995 |
| WO | WO 95-31845 | 11/1995 |
| WO | WO 96-10851 | 4/1996 |
| WO | WO 96-31706 | 10/1996 |
| WO | WO 97-08801 | 3/1997 |

OTHER PUBLICATIONS

Supplementary European Search Report for Application No. EP 14817314, dated Jan. 6, 2017, 3pgs.

* cited by examiner

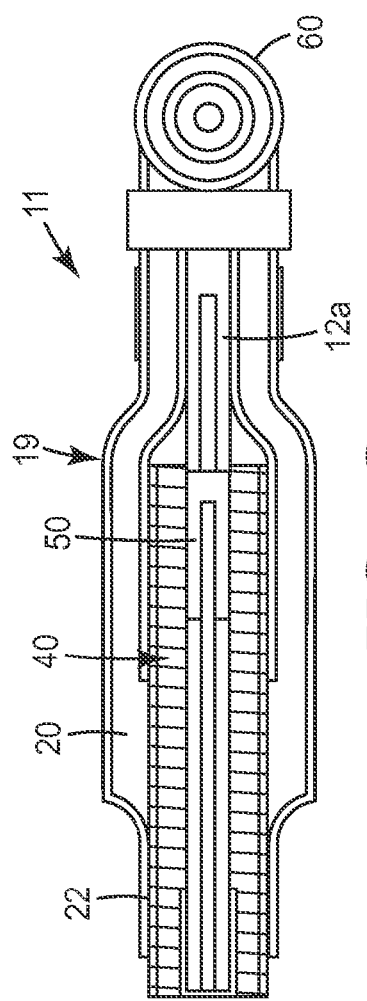
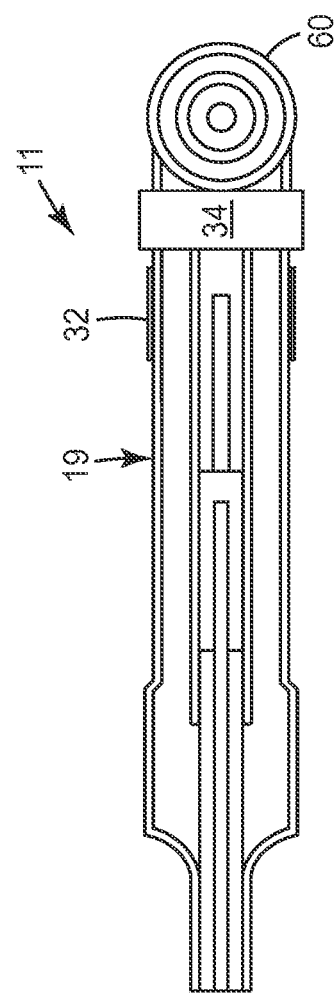
FIG. 3C
FIG. 3D

POWER CABLE TERMINAL CONNECTION DEVICE

TECHNICAL FIELD

The invention relates to terminal connections for power cables.

BACKGROUND

As electrical power distribution becomes more complex through the advent of renewable energy, distributed generation and the adoption of electric vehicles, intelligent electrical distribution and associated electrical sensing is becoming more useful and even necessary. Useful sensing may include voltage, current, and the time relationship between voltage and current at various locations within a power distribution network.

In addition, during replacement of an existing cable termination, e.g., for repair/maintenance or feature upgrades, such as adding sensing capabilities, reconnecting the existing cable to the new termination can be a difficult operation. For example, replacing a cable termination may include cutting off the existing cable termination in its installed location. Such installed locations may include switchgear enclosures, bus bar cabinets, or adjacent generators, motors, transformers, or other equipment. The installed locations may provide limited space to perform the replacement and to fit the replacement termination. In addition, when an existing cable termination is removed, the remaining power cable may be shortened somewhat. This shortening of the cable may cause additional difficulties because the shortened cable will still need to provide an electrical connection to its original endpoint.

SUMMARY

In general, this disclosure is directed to terminal connections for power cables, such as medium and high voltage power cables. This disclosure includes techniques for replacing a terminal connection in an existing cable installation as well as terminal connections suitable for an initial installation. In some examples, this disclosure is directed to terminal connections providing sensing capabilities, such as voltage and/or current sensing capabilities. The sensing capabilities may be provided by retrofitting an existing cable installation with new terminal connection components, such as a new complete terminal connection or a new terminal connection adapter.

In one aspect, the disclosure is directed to a terminal connection device that comprises a contiguous body disposed onto an inner conductor. The inner conductor includes a first end mateable with a power cable connector and a second end. The body comprises a multilayer structure having an inner conductive or semiconductive layer disposed over at least a portion of the power cable connector, an insulating layer and an outer conductive or semiconductive layer. The body surrounds the first end of the inner conductor and extending towards the second end of the inner conductor. The body also includes an electrically isolated section of conductive or semiconductive material.

In another aspect, an assembly comprises the terminal connection device described above, wherein the body covers a power connector and an end portion of a power cable.

In another aspect, an adapter for providing a connection between a power cable and a connection interface comprises a contiguous body overmolded onto an inner conductor. The inner conductor includes a first end mateable with a power cable connector and a second end mateable with a connection interface. The body comprises a multilayer structure having an inner conductive or semiconductive layer disposed over at least a portion of the power cable connector, an insulating layer and an outer conductive or semiconductive layer. The body surrounds the first end of the inner conductor and extending towards the second end of the inner conductor, wherein the second end of the inner conductor extends beyond an end of the body.

In another aspect, a terminal connection device comprises an inner conductor and a contiguous body disposed onto the inner conductor. The contiguous body comprises an insulating layer surrounding the inner conductor and extending beyond a first end of the inner conductor to form a hollow interior section adjacent to the end of the inner conductor. The body also includes an outer conductive or semiconductive layer adjacent to and surrounding the insulating layer. The body also includes an electrically isolated section of conductive or semiconductive material in contact with an outer surface of the insulating layer. The terminal connection device is configured to receive an end of a cable conductor of the power cable such that the end of cable conductor of the power cable fits within the hollow interior section and electrically connects to the first end of the inner conductor. The electrically isolated section of conductive or semiconductive material forms an electrode of a sensing capacitor of a capacitive voltage sensor. The insulating layer is operable to form a dielectric of the sensing capacitor of the capacitive voltage sensor.

In another aspect, an assembly includes the terminal connection device and a power cable. The power cable includes a cable conductor extending along a length of the power cable, a cable insulating layer surrounding the cable conductor except a portion of the cable conductor that protrudes from the cable insulating layer at an end portion of the power cable, an inner cable semiconductor or conductor layer between the cable conductor and the cable insulating layer, the inner cable semiconductor or conductor layer being adjacent to the cable insulating layer, and an outer cable semiconductor or conductor layer adjacent to and surrounding the cable insulating layer.

In a further aspect, an adapter comprises an inner conductor having a first end and a second end and a contiguous body disposed onto the inner conductor. The body comprises an insulating layer surrounding the inner conductor and extending beyond the first end of the inner conductor to form a hollow interior section adjacent to the first end of the inner conductor. The body also comprises an outer conductive or semiconductive layer adjacent to and surrounding the insulating layer. The body also comprises an electrically isolated section of conductive or semiconductive material in contact with an outer surface of the insulating layer. The adapter is configured to receive an end of a cable conductor of a power cable such that the end of the cable conductor of the power cable fits within the hollow interior section and electrically connects to the first end of the inner conductor. The second end of the inner conductor extends beyond the insulating layer and the outer conductive or semiconductive layer, wherein the second end of the inner conductor opposes the first end of the inner conductor, and wherein the second end of the inner conductor is mateable with a connection interface.

In another aspect, a method for retrofitting a power cable comprises disconnecting a cable accessory from the power cable, mating a first end of an adapter, such as described herein, to an end of the power cable, and mating a second end of the adapter to a connection interface.

In another aspect, a method for installing a terminal connection device with a capacitor on a power cable to facilitate voltage sensing comprises attaching a power cable connector onto an end of the power cable. A terminal connection device, including the capacitor, is mated to the power cable connector on the end of the power cable. The terminal connection device comprises the terminal connection device described herein.

In another aspect, a method for retrofitting a power cable comprises, disconnecting a cable accessory from the power cable and mating a terminal connection device including the capacitor, such as described herein, to an end of the cable.

The above summary of the present invention is not intended to describe each illustrated embodiment or every implementation of the present invention. The details of one or more examples of this disclosure are set forth in the accompanying drawings and the description below. Other features, objects, and advantages of the disclosed techniques will be apparent from the description and drawings, and from the claims.

BRIEF DESCRIPTION OF DRAWINGS

FIGS. 3A-3D illustrate example steps for installing the terminal connection device of FIG. 2 on a power cable.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
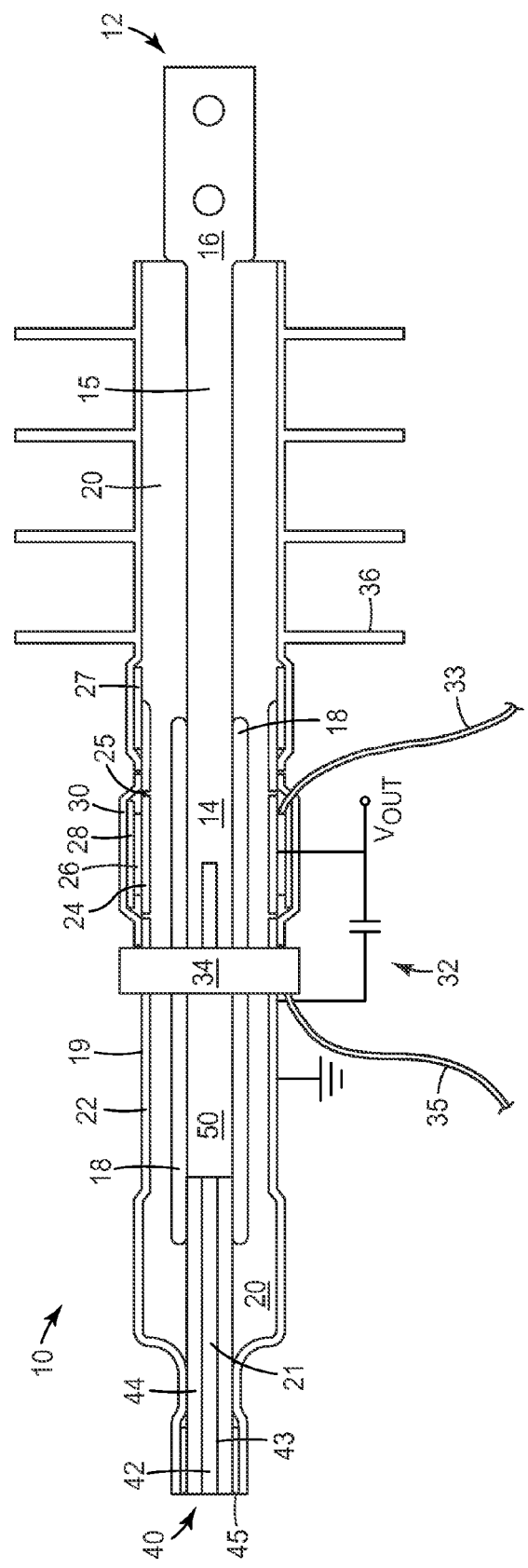
FIG. 1 is an illustration of an example terminal connection device that includes an electrically isolated section of conductive or semiconductive material forming an electrode of a sensing capacitor of a capacitive voltage sensor.
Figure 2:
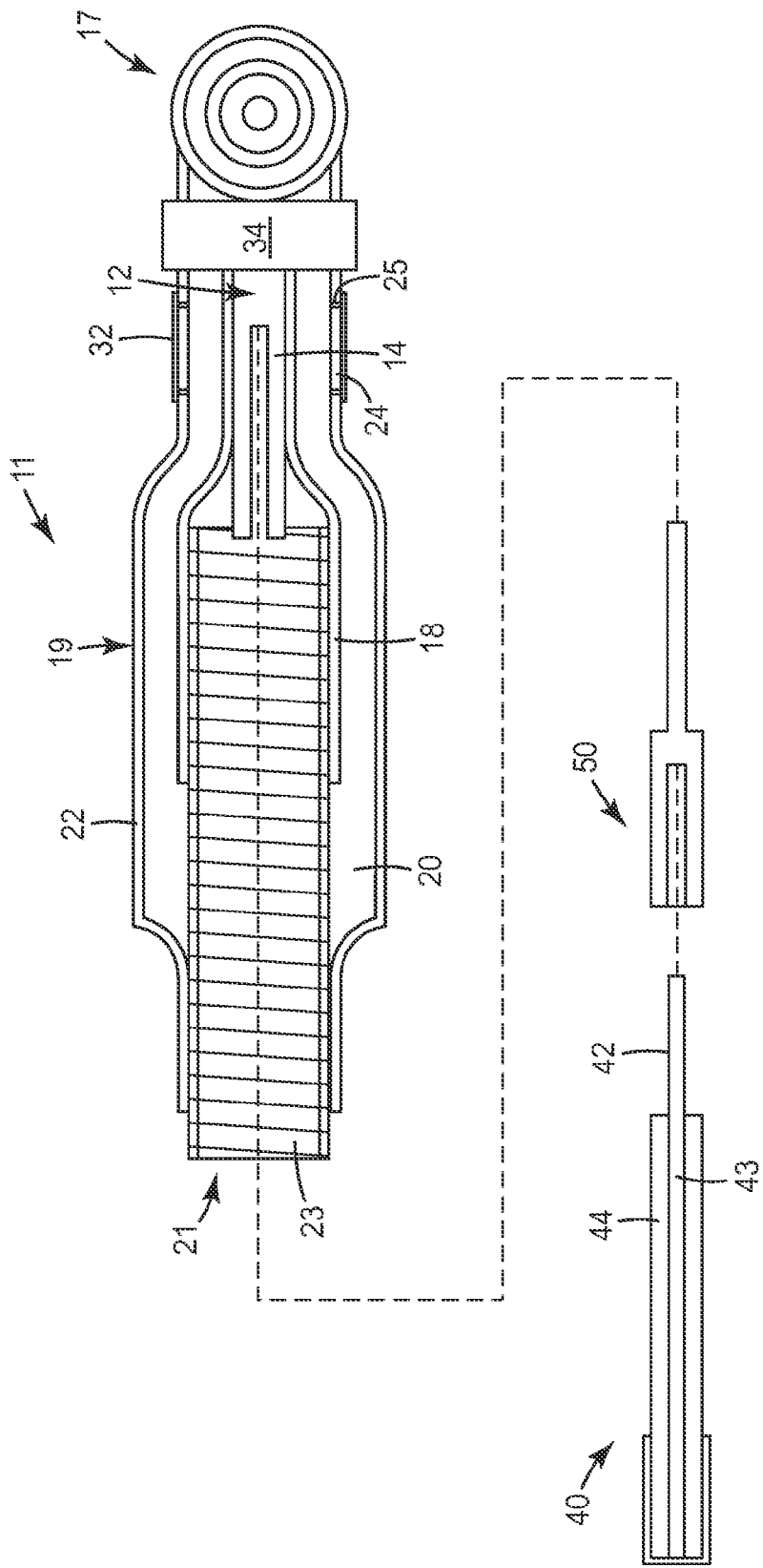
FIG. 2 is an illustration of an example terminal connection device that includes a T body and an electrically isolated section of conductive or semiconductive material forming an electrode of a sensing capacitor of a capacitive voltage sensor.

The present disclosure describes a terminal connection device for use in medium or high voltage power connection applications. In many aspects, the terminal connection device includes integrated sensor technology. The terminal connection device can be a fully integrated structure, such as shown in FIGS. 1-2, having a pre-installed connection interface. Alternatively, the terminal connection device can be configured as an adapter which can be mounted in the field to a connection interface. In either aspect, the terminal connection device is retrofittable, in that it can be used to replace existing cable accessories with a new accessory having integrated sensing technology. Further, the terminal connection device described herein can directly connect an existing power utility cable to a connection interface without the need for using an interface cable. In addition, components of the incorporated capacitive voltage sensor can be factory-molded to specific dimensions, allowing for precise and direct measurement of the voltage of a conductor, while reducing or eliminating calibration time and cost. Further, the terminal connection device can be dimensionally smaller than conventional field-assembled solutions that include an interface cable. The terminal connection device can be particularly useful in tight spaces such as in switchgears, generators, transformer boxes, busbar installations, and motors. In some embodiments, the terminal connection device provides a shrinkable portion that can be expanded to receive cables having a range of diameters.

FIG. 1 is an illustration of an example terminal connection device 10 that includes an electrically isolated section of conductive or semiconductive material 24 forming an electrode of a sensing capacitor of a capacitive voltage sensor 32. FIG. 1 further illustrates a power cable 40 in an assembly with terminal connection device 10.

The terminal connection device 10 is relatively compact such that terminal connection device 10 may be suitable for a retrofit installation into a variety of space constricted locations of a power distribution network including, but not limited to, underground locations, switchgears, vaults, motors, transformer boxes and other locations. In this manner, terminal connection device 10 may facilitate adding sensing capabilities into preexisting power distribution networks. Terminal connection device 10 may of course also be used in the installation of new power distribution networks.

Referring to FIG. 1, terminal connection device 10 is configured to control the electrical field created by medium or high voltage within power cable 40, wherein the power cable operates at voltages in excess of 1,000 Volts.

Terminal connection device 10 is installed on the end of power cable 40, as described in further detail below. Terminal connection device 10 includes inner conductor 12. Inner conductor 12 includes a first end, which can be formed as a connector, such as a female connector 14, an axial elongated conductor 15, and a second end or an integral connection interface which can be, for example, a lug 16, as shown in FIG. 1. Alternatively, the connection interface can comprise a separable connector, a splice, a modular connector, and other connection interfaces such as described herein.

Female connector 14 may have a circular cross section. Female connector 14 is configured to mate to a male end of power cable connector 50 to facilitate an electrical connection to cable conductor 42 of power cable 40. In alternative aspects, the first end of the inner conductor can be formed as a male or hybrid type connector. Terminal connection device 10 also optionally includes dielectric stress control features 36 to mitigate the potential for leakage currents and electrical failure. For example, the stress control features can be implemented as multiple skirts protruding outward which serve to reduce creeping currents from the exposed lug 16.

In one aspect, terminal connection device 10 includes a multi-layer body 19 that surrounds the inner conductor 12. For example, terminal connection device 10 further includes insulating layer 20, which concentrically surrounds inner conductor 12 and extends beyond the first end of inner conductor 12 to form hollow interior section 21 adjacent to the end of inner conductor 12. As shown in FIG. 1, hollow interior section 21 can be filled by connector 50 and the end of power cable 40.

Power cable 40 includes cable conductor 42, which may be a solid or stranded metal axial conductor such as an aluminum or copper alloy conductor. Insulating layer 44 concentrically surrounds cable conductor 42. Power cable 40 optionally includes a semi-conductive or conductive layer 43 concentrically adjacent to and surrounding cable conductor 42. The optional semi-conductive or conductive layer 43 functions to eliminate or reduce the potential for voids between cable conductor 42 and insulating layer 44 that might allow leakage leading to degradation of insulating layer 44. An outer conductive or semiconductive layer 45 can also be provided on the power cable 40. A conductive male connector 50 is mounted to the end of cable conductor 42 to facilitate an electrical connection between cable conductor 42 of power cable 40 and inner conductor 12 of terminal connection device 10.

The terminal connection device 10 is configured to receive the end of cable conductor 42 such that the end of cable conductor 42 fits within hollow interior section 21 and electrically connects to the end of inner conductor 12.

In some aspects, inner conductor 12 is formed from a single piece of solid metal. In other examples, inner conductor 12 may be formed from more than one piece of metal. In such examples, elongated conductor 15 may include a stranded wire conductor. In further aspects, inner conductor 12 may be formed partially as a solid metal conductor and partially as a stranded wire conductor. In any event, elongated conductor 15 provides a direct electrical and mechanical connection between the first end and the second end of the inner conductor 12, for example between a female connector 14 and a lug 16.

In some examples, the multi-layer body 19 includes stress control elements within and can also include a shrinkable sleeve portion. The shrinkable sleeve can be, for example, a cold shrinkable sleeve or a heat shrinkable sleeve. Alternatively, the body 19 can be a push-on type. In one aspect, the insulating layer 20 is part of a cold shrinkable sleeve that is initially radially expanded on a removable support core (such as is shown in FIG. 2) that forms hollow interior section 21. In such examples, the shrinkable sleeve is selectively radially contractible to positively engage the end of the inserted cable conductor 42 within hollow interior section 21. In some examples, the shrinkable sleeve is selectively contractible to positively engage power cable 40, including cable conductor 42 and insulating layer 44, as well as connector 50. Example techniques for shrinkable sleeves that facilitate connections to a cable are disclosed in WO97/08801 the entire content of which is incorporated by reference herein.

The multi-layer body 19 of terminal connection device 10 further includes outer conductive or semiconductive layer 22 adjacent to and concentrically surrounding insulating layer 20. In addition, the body 19 of terminal connection device 10 includes an electrically isolated section of conductive or semiconductive material 24 in contact with an outer surface of insulating layer 20. Electrically isolated section of conductive or semiconductive material 24 forms an electrode of a sensing capacitor of capacitive voltage sensor 32. In addition, insulating layer 20 is operable to form a dielectric of the sensing capacitor of capacitive voltage sensor 32.

In some examples, electrically isolated section of conductive or semiconductive material 24 may be in an annular ring configuration and be electrically isolated from outer conductive or semiconductive layer 22 by non-conductive axial sections 25. Non-conductive axial sections 25 may comprise non-conductive material or a void.

In such examples, outer conductive or semiconductive layer 22 may be discontinuous at two longitudinal positions to form electrically isolated section of conductive or semiconductive material 24 in the annular ring configuration. In such examples, electrically isolated section of conductive or semiconductive material 24 and outer conductive or semiconductive layer 22 may be formed out of a common material and manufacturing process, such that electrically isolated section of conductive or semiconductive material 24 and outer conductive or semiconductive layer 22 have a common thickness.

In other examples, electrically isolated section of conductive or semiconductive material 24 may be formed from a different material than outer conductive or semiconductive layer 22 and/or have a different configuration such as a rectangular or round shape formed by a flexible material affixed to insulating layer 20. Electrically isolated section of conductive or semiconductive material 24 may, for example, comprise an electrically conductive metal or an electrically conductive polymer. As one example, electrically isolated section of conductive or semiconductive material 24 may comprise a layer of copper. In some examples, terminal connection device 10 may include an adhesive that affixes electrically isolated section of conductive or semiconductive material 24 to insulating layer 20. In some examples, electrically isolated section of conductive or semiconductive material 24 may include a rubber tape or a self-fusing material, such as a rubber mastic material. In some examples, the electrically isolated section of conductive or semiconductive material 24 may include a heat shrinkable or cold shrinkable material.

In some aspects, inner and outer conductive or semiconductive layers 18, 22 and insulating layer 20 of terminal connection device 10 may be made from any materials suitable for shrinkable sleeve applications. Most suitable are materials such as a highly elastic rubber material that has a low permanent set, such as ethylene propylene diene monomer (EPDM), elastomeric silicone, or a hybrid thereof, that may include conventional additives to make the layers appropriately conductive, semiconductive or insulating, as needed. The conductive or semiconductive layers and the insulating layer may be made of the same or different types of materials, depending on the types of additives which may be incorporated in the individual layers. The inner and outer conductive or semiconductive layers and the insulating layer may have differing degrees of conductivity and insulation based on the inherent properties of the materials used or based on additives added to the materials.

The multi-layer body 19 of terminal connection device 10 may also include inner conductive or semiconductive layer 18 that is disposed between inner conductor 12 and insulating layer 20. Inner conductive or semiconductive layer 18 is adjacent to insulating layer 20 and inner conductor 12. The optional inner conductive or semiconductive layer 18 functions to eliminate or reduce the potential for voids between inner conductor 12 and insulating layer 20 that might allow leakage leading to degradation of insulating layer 20 For this reason, inner conductive or semiconductive layer 18 may be particularly useful when inner conductor 12 provides an irregular surface, such as when elongated conductor 15 includes stranded wire. In this aspect, inner conductive or semiconductive layer 18 can act as a cage electrode. Inner conductive or semiconductive layer 18 may further function to provide improved adhesion between inner conductor 12 and insulating layer 20. In addition, the shape of the inner conductive layer 18 may be configured to provide geometric stress control for the inner conductor 12.

In some aspects, terminal connection device 10 further includes capacitive voltage sensor 32. Capacitive voltage sensor 32 is operable to sense a voltage within inner conductor 12, which is also representative of the voltage within cable conductor 42 by way of the connection between the end of cable conductor 42 and female connector 14 of inner conductor 12. As mentioned above, electrically isolated section of conductive or semiconductive material 24 forms an electrode of a sensing capacitor of capacitive voltage sensor 32. In addition, insulating layer 20 is operable to form a dielectric of the sensing capacitor of capacitive voltage sensor 32.

Electrically isolated section of conductive or semiconductive material 24 is operable to form an electrode of the sensing capacitor of capacitive voltage sensor 32. Electrically isolated section of conductive or semiconductive material 24 may, for example, have two opposed major surfaces, e.g. first and second major surfaces. The first major surface may be in mechanical contact with insulating layer 20. The second major surface may be in mechanical contact with a capacitive element, such as a capacitor, circuitry, or a printed circuit board (PCB) 26. In many aspects, the capacitive element, such as PCB 26, has a pre-defined capacitance value.

Capacitive voltage sensor 32 further includes capacitive element (here PCB 26), which is in electrical contact with electrically isolated section of conductive or semiconductive material 24. In one aspect, the PCB 26 is located close to or directly over the electrically isolated section of conductive or semiconductive material 24 to arrange for electrical contact with the isolated section of conductive or semiconductive material 24, which in turn is arranged on insulating layer 20. PCB 26 is in mechanical contact with insulating layer 20 via electrically isolated section of conductive or semiconductive material 24. PCB 26 further includes at least one additional capacitor or other capacitive element to form a capacitive voltage divider for determining the voltage of inner conductor 12 by way of the detected voltage of electrically isolated section of conductive or semiconductive material 24. The capacitor(s) of PCB 26 may be electrically connected to electrically isolated section of conductive or semiconductive material 24. The capacitive element may be operable as a secondary capacitor in a capacitive voltage divider. The capacitive voltage divider may comprise the sensing capacitor, which includes electrically isolated section of conductive or semiconductive material 24, and the secondary capacitor.

In some aspects, PCB 26 may be flexible such that PCB 26 may be bent to conform around electrically isolated section of conductive or semiconductive material 24. PCB 26 may establish electrical contact to electrically isolated section of conductive or semiconductive material 24 in several locations. This construction avoids the disadvantages of having electrical contact only in one location on electrically isolated section of conductive or semiconductive material 24, such as, problems resulting from a bad electrical contact in the one location, if that one contact is, e.g., incomplete, corroded, or damaged, which might preclude a voltage reading. In addition providing multiple points of contact may avoids problems arising from the fact that electrons travelling from a rim of electrically isolated section of conductive or semiconductive material 24 to a single contact location experience the electrical resistance of electrically isolated section of conductive or semiconductive material 24 over a longer path. This, in turn, may lead to a voltage drop and eventually to a lower, i.e. less accurate, voltage being measured on PCB 26.

In some examples, PCB 26 may be mechanically attached to electrically isolated section of conductive or semiconductive material 24. In other examples, PCB 26 may alternatively be in a pressure contact with electrically isolated section of conductive or semiconductive material 24. PCB 26 may comprise a double-sided PCB, i.e. PCB 26 can have opposed first and second major sides. Alternatively the PCB 26 can be located remotely from the isolated section of conductive or semiconductive material 24, where the PCB 26 can be electrically coupled to the isolated section of conductive or semiconductive material 24. For example, FIG. 4B, described in further detail below, shows an example adapter 13' having a PCB 26 remotely located from the isolated section of conductive or semiconductive material 24.

An exposed conductive region of PCB 26 may comprise a layer of conductive metal, e.g. gold, silver, or copper. A copper layer may be gold-plated for enhanced electrical contact and/or for protection against environmental influences, e.g. against corrosion. In different examples, an exposed conductive region of PCB 26 may provide a continuous surface contact area or a patterned, i.e. interrupted, non-continuous, surface contact area for contact with electrically isolated section of conductive or semiconductive material 24. All parts of the patterned surface contact area may be electrically connected with each other. A patterned surface contact area may require less conductive material for manufacturing it, while having only a negligible influence on reliability of the electrical contact and resistive losses. A patterned surface contact area may also enhance the mechanical flexibility of PCB 26, thus reducing the risk of layer cracking when PCB 26 is bent, and of flaking. In a specific example, the exposed conductive region comprises a patterned gold-plated copper layer.

A pattern of the surface contact area may, for example, be a grid with a square-shaped or a diamond-shaped pattern. PCB 26 may comprise a flexible portion. An exposed conductive region as described above may be arranged on the flexible portion. In particular, PCB 26 may comprise a flexible PCB. A flexible portion of PCB 26 and in particular a flexible PCB may allow PCB 26 to conform better to electrically isolated section of conductive or semiconductive material 24. This, in turn, enhances the electrical contact between PCB 26 and electrically isolated section of conductive or semiconductive material 24 and thereby makes the contact more reliable, reduces resistive losses, and facilitates higher accuracy of the voltage sensor.

PCB 26 may generate a signal that is indicative of the voltage of cable conductor 42 and inner conductor 12. Sensor wire 33 is attached to PCB 26 for transmitting the sensor voltage signal from PCB 26. In some examples, electrical measurement circuitry may be incorporated into the PCB 26; in other examples, PCB 26 may include electrical measurement circuitry.

A ground wire (not shown) may be attached to outer conductive or semiconductive layer 22 for connecting electrical ground to the electrical measurement circuitry. The electric measurement circuitry may be operational to determine the voltage of cable conductor 42 and inner conductor 12 versus ground.

In some examples, PCB 26 may be adapted to support a plurality of electronic components, which may serve other purposes, e.g. safety mechanisms for in case of ground fault and components that form electronic circuits for temperature compensation or additional sensing such as temperature, humidity, magnetic field, etc.

In one aspect sensor insulation layer 28 is adjacent to the isolated section of conductive or semiconductive material 24. In another aspect the sensor insulation layer 28 is adjacent to the PCB 26 and on the opposing side of PCB 26 relative to electrically isolated section of conductive or semiconductive material 24. Outer sensor conductive or semiconductive layer 30 is adjacent to sensor insulation layer 28 on the opposing side of sensor insulation layer 28 relative to PCB 26. Outer sensor conductive or semiconductive layer 30 may be electrically connected to outer conductive or semiconductive layer 22, e.g., at ground potential. Outer sensor conductive or semiconductive layer 30 and outer conductive or semiconductive layer 22 may function to substantially encapsulate capacitive voltage sensor 32, including electrically isolated section of conductive or semiconductive material 24, non-conductive axial sections 25, PCB 26 and sensor insulation layer 28. In some examples, outer sensor conductive or semiconductive layer 30 and outer conductive or semiconductive layer 22 may be formed as a unitary feature over the other components of terminal connection device 10, including capacitive voltage sensor 32 and insulating layer 20.

The design and configuration of terminal connection device 10 facilitates precise dimensional control of all components of the terminal connection device 10. As previously mentioned, inner conductor 12 may be formed from a single section of solid metal, such as a machined metal element. Thus, the dimensions and shape of inner conductor 12 may be precisely controlled.

In addition, inner conductive or semiconductive layer 18, if present, may provide a substantially consistent thickness. In particular, inner conductive or semiconductive layer 18 may provide a substantially consistent thickness over the longitudinal positions of electrically isolated section of conductive or semiconductive material 24 and capacitive voltage sensor 32. Likewise, insulating layer 20 may also provide a substantially consistent thickness over the longitudinal positions of electrically isolated section of conductive or semiconductive material 24 and capacitive voltage sensor 32.

The precise dimensional control facilitated by the design and configuration of terminal connection device 10 allows for precise voltage measurements by capacitive voltage sensor 32. For example, capacitance is directly related to the geometry of two conductive electrodes and the insulation forming the capacitor. With respect to capacitive voltage sensor 32, the sensing capacitor is formed from inner conductor 12, insulating layer 20 and electrically isolated section of conductive or semiconductive material 24. By precisely controlling the dimensions and shape of inner conductor 12, the dimensions and shape of insulating layer 20 and electrically isolated section of conductive or semiconductive material 24 the capacitance can also be precisely controlled. Furthermore, if inner conductor 12 is formed from a solid metal, terminal connection device 10 may resist bending stresses which may alter the geometry of the sensing capacitor. In contrast, in a design in which inner conductor 12 includes a stranded wire, the geometry of the sensing capacitor may change more easily.

In any event, the capacitance of the sensing capacitor, including inner conductor 12, insulating layer 20 and electrically isolated section of conductive or semiconductive material 24 may be tested during manufacture of terminal connection device 10 in order to calibrate voltage signals from capacitive voltage sensor 32 to the capacitance of the sensing capacitor. This may further increase the precision of capacitive voltage sensor 32.

In some examples, electrically isolated section of conductive or semiconductive material 24 forming the electrode of the sensing capacitor may overlap inner conductor 12 along a longitudinal dimension of insulating layer 20. While terminal connection device 10 illustrates electrically isolated section of conductive or semiconductive material 24 overlapping a portion of connector 50 along a longitudinal dimension of insulating layer 20, in other examples, electrically isolated section of conductive or semiconductive material 24 may only overlap elongated conductor 15 along a longitudinal dimension of insulating layer 20.

In some examples, terminal connection device 10 may be formed using overmolded construction. For example inner conductive or semiconductive layer 18 may be overmolded on inner conductor 12. Similarly, insulating layer 20 may be an overmolded insulating layer overmolded on inner conductive or semiconductive layer 18 or overmolded directly on inner conductor 12 if inner conductive or semiconductive layer 18 is not included in the terminal connection device. Likewise, outer conductive or semiconductive layer 22 may be an overmolded outer conductive or semiconductive layer overmolded on insulating layer 20. As such, in some aspects the multilayer body 19 of the terminal connection device 10 can be formed as a contiguous overmolded body that comprises the insulating layer 20, the outer conductive or semiconductive layer 22, the isolated section of conductive or semiconductive material 24, and optionally the inner conductive or semiconductive layer 18.

Terminal connection device 10 may further include a current sensor 34. Current sensor 34 is configured to measure an electrical current within cable conductor 42 and/or inner conductor 12. Current sensor 34 is coupled to sensor wire 35 to output signals indicating a sensed current. In some examples, current sensor 34 may include a Rogowski coil. A Rogowski coil produces a voltage that is proportional to the derivative of the current, meaning that an integrator can be utilized to revert back to a signal that is proportional to the current. Alternatively, the current sensor can be configured as a magnetic core current transformer that produces a current proportional to the current on the inner conductor 12. Although current sensor 34 is located adjacent to capacitive voltage sensor 32 near the first end of the inner conductor, in other aspects, current sensor 34 can be positioned at a different location on the terminal connection device or on cable 40.

Because terminal connection device 10 further includes both current sensor 34 and capacitive voltage sensor 32, terminal connection device 10 facilitates calculation of phase angle (power factor), Volt Amps (VA), Volt Amps reactive (VAr), and Watts (W).

In some aspects, terminal connection device 10 can further include an electrically conductive or semiconductive stress control layer 27 arranged coaxially about at least a portion of inner conductor 12. The stress control layer 27 can be formed from a high-k material, such as silicone containing carbon particles. The stress control layer can provide refractive stress control for reducing the risk of potential discharges between inner conductor 12 and the outer conductive or semiconductive layer 22.

FIG. 2 is an illustration of an exploded assembly including power cable 40, connector 50 and terminal connection device 11. Terminal connection device 11 is substantially similar to terminal connection device 10, except that terminal connection device 11 incorporates a separable connection, such as in the form of a T-body or elbow, as opposed to a lug. Like terminal connection device 10, terminal connection device 11 includes an electrically isolated section of conductive or semiconductive material forming an electrode of a sensing capacitor of a capacitive voltage sensor. Features of terminal connection device 11 that are numbered the same as the corresponding features terminal connection device 10 may be considered to be functionally similar. For brevity, these features are discussed in limited or no detail with respect to terminal connection device 11.

Within the assembly of FIG. 2, conductive power cable connector 50 is mounted to the end of cable conductor 42 to facilitate an electrical connection between cable conductor 42 of power cable 40 and inner conductor 12 of terminal connection device 11.

Terminal connection device 11 is installed on the end of power cable 40. Terminal connection device 11 includes inner conductor 12. Inner conductor 12 comprises a first end having a connector, such as a female connector, an axial elongated conductor and a second end or an integral connection interface which can be, for example, separable connector 17, a lug, a splice, a modular connector, and other connection interfaces such as described herein. In this example, the first end of the inner conductor is configured as a female connector 14 that is mateable with power cable connector 50, in this case a male connector end of power cable connector 50, to facilitate an electrical connection to cable conductor 42 of power cable 40.

Terminal connection device 11 may further include a multi-layer body 19 having an insulating layer 20, which concentrically surrounds inner conductor 12 and extends beyond the first end of inner conductor 12. In this aspect, at least part of the receiving portion of the body 19 is formed as a shrinkable sleeve expanded on to a removable support core 23. The expanded portion forms a hollow interior section 21 adjacent to the first end of inner conductor 12. As shown in FIG. 2, hollow interior section 21 is configured to receive connector 50 and the end of power cable 40. In some examples, insulating layer 20 may include a shrinkable sleeve that forms hollow interior section 21. The multi-layer body 19 of terminal connection device 11 may also include inner conductive or semiconductive layer 18 disposed between inner conductor 12 and insulating layer 20 and disposed over at least a portion of an inserted power cable connector 50. Inner conductive or semiconductive layer 18 functions to eliminate or reduce the potential for voids between inner conductor 12 and insulating layer 20 that might allow leakage leading to degradation of insulating layer 20. The multi-layer body 19 of the terminal connection device 11 is configured to surround (or contact, when in an un-expanded state) the first end of the inner conductor. In addition, the multi-layer body 19 of the terminal connection device 11 is configured to extend towards the second end of the inner conductor 12.

Terminal connection device 11 further includes an electrically isolated section of conductive or semiconductive material that can serve as an electrode for a capacitive voltage sensor, such as capacitive voltage sensor 32. As discussed with respect to FIG. 1, capacitive voltage sensor 32 includes an electrically isolated section of conductive or semiconductive material, non-conductive axial sections, a capacitive element, such as a capacitor or PCB, and a sensor insulation layer. In some examples, the capacitive element may be mechanically attached to the electrically isolated section of conductive or semiconductive material. In other examples, the capacitive element, in this case a PCB, may alternatively be in a pressure contact with the electrically isolated section of conductive or semiconductive material. Alternatively the capacitive element can be located remotely from the electrically isolated section of conductive or semiconductive material 24, As also discussed with respect to FIG. 1, outer conductive or semiconductive layer 22 surrounds insulating layer 20 and may combine with an outer sensor conductive or semiconductive layer to substantially encapsulate capacitive voltage sensor 32.

Terminal connection device 11 can further include current sensor 34. Current sensor 34 is configured to measure an electrical current within cable conductor 42 and/or inner conductor 12. Because terminal connection device 11 can include both current sensor 34 and capacitive voltage sensor 32, terminal connection device 11 can facilitate calculation of phase angle (power factor), Volt Amps (VA), Volt Amps reactive (VAr), and Watts (W).

Terminal connection devices 10, 11 illustrate two possible examples of terminal connection devices that may utilize a capacitive voltage sensor 32. In other embodiments, the terminal connection devices as described herein may also include a connection interface as part of a single structure. A variety of connection interfaces may be used, such as a separable connector, a loadbreak elbow connector, a straight plug, a straight plug receptacle, a multi-way junction, a loadbreak reducing tap plug elbow, an injection port elbow, a feed-thru parking bushing, a feed-thru bushing insert, a deadbreak reducing plug elbow, a connecting plug elbow, a connecting plug, a bushing insert, and a cable adapter. In each of these examples, a dimensionally controlled inner conductor 12 may provide a direct mechanical and electrical connection to the termination to facilitate precision capacitive voltage sensing of voltage within the inner conductor as disclosed herein. Utilization of the techniques disclosed herein with each of these terminal connection devices is within the spirit of this disclosure.

Figure 3A:
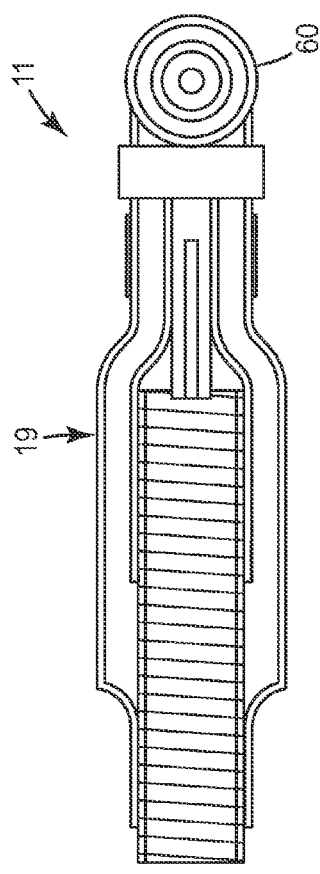

FIGS. 3A-3D illustrate example steps for installing a terminal connection device, such as terminal connection device 11 on the end of power cable 40. In particular, FIG. 3A illustrates terminal connection device 11, the end of cable 40 and power cable connector 50 prior to beginning the installation procedure. The power cable 40 can be prepared by removing a portion of the cable insulator 44 to expose cable conductor 42. In a retrofitting procedure, the preexisting cable accessory or preexisting terminal connection device may have been removed from the end of cable 40, e.g., by cutting cable 40. Then, a portion of cable insulator 44 may be removed to expose cable conductor 42.

Figure 3B:
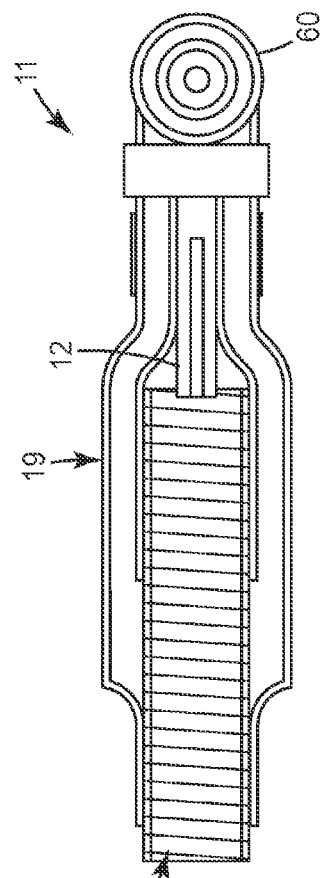

Next, as shown in FIG. 3B, power cable connector 50 is installed on the exposed portion of cable conductor 42. As one example, the power cable connector 50 may be secured to the exposed portion of cable conductor 42 by crimping, or with one or more screws, pins or other mechanical connection. In other examples, power cable connector 50 may simply slide over the exposed portion of cable conductor 42 with a slight interference fit such that it remains removable from the exposed portion of cable conductor 42.

Next, as represented by FIG. 3C, the assembled cable 40 and connector 50 are inserted into hollow interior section 21 formed by insulating layer 20 and outer conductive or semiconductive layer 22 such that connector 50 is mated to the female connector features of inner conductor 12. Alternatively, the connector 50 may be configured as a female type or hybrid type connector and the first end of the inner conductor 12 can be correspondingly configured to mate with connector 50.

Next, as represented by FIG. 3D, the shrinkable sleeve formed by insulating layer 20 and outer conductive or semiconductive layer 22 may be selectively contracted around the end of cable 40. For embodiments of the terminal connection device that utilize a cold shrinkable sleeve portion, such as shown in FIGS. 3A-3C, the support core can be removed so that a portion of the interior surface of the body of the terminal connection device is in intimate contact with connector 50 and power cable 40. As previously mentioned, example techniques for shrinkable sleeves that facilitate connections to a cable are disclosed in WO97/08801 Thus, as shown in FIG. 3D, terminal connection device 11 is installed on cable 40 and may provide voltage and current sensing capabilities via capacitive voltage sensor 32 and current sensor 34. Optionally, the assembly can be covered with a conventional protective coating or jacket.

Figure 4A:
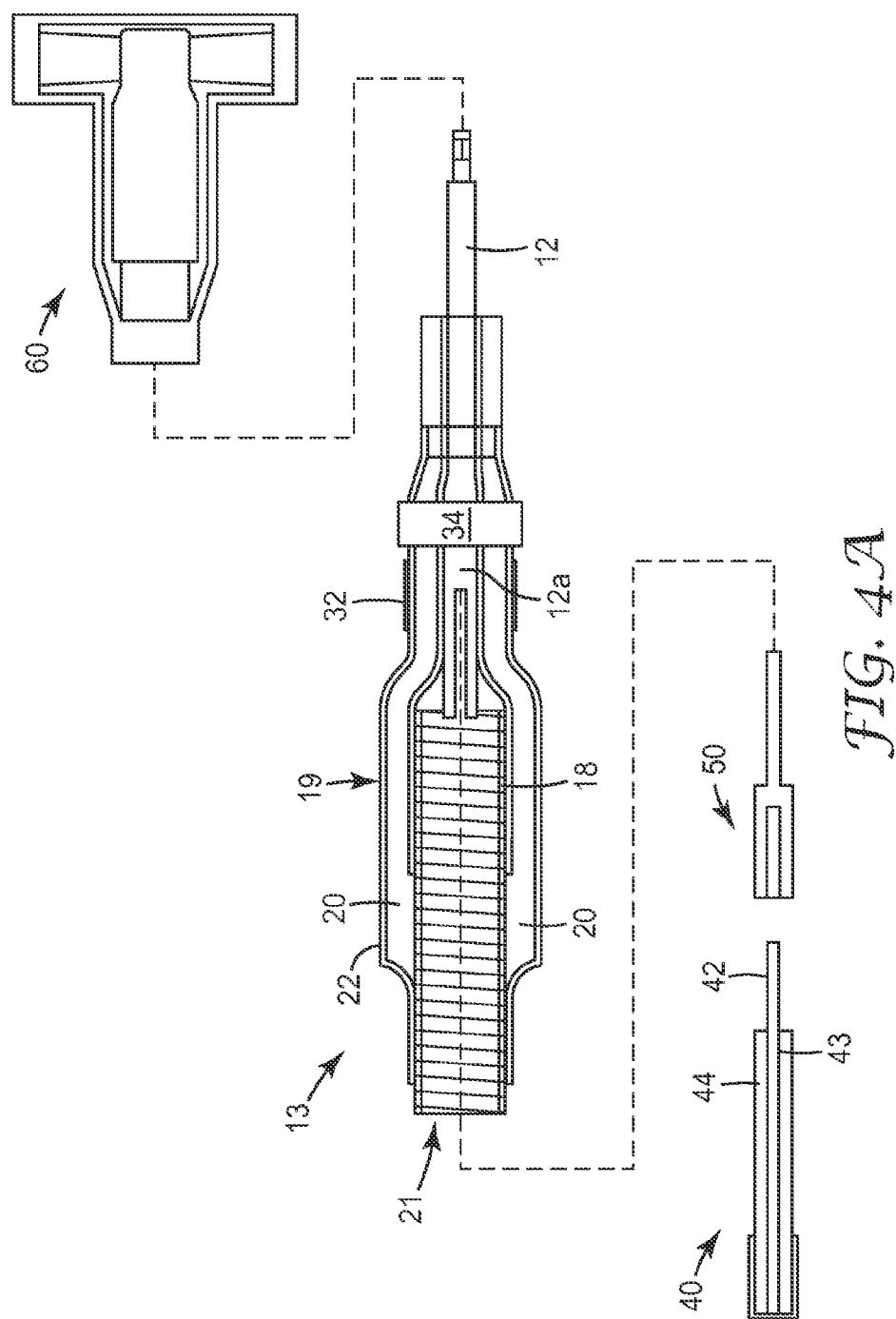
FIG. 4A is an illustration of a terminal connection device that includes an adapter with an electrically isolated section of conductive or semiconductive material forming an electrode of a sensing capacitor of a capacitive voltage sensor.

While the terminal connection device 10, 11 can be provided with a connection interface pre-mounted onto the second end of the inner conductor 12, in another aspect, the terminal connection device can be provided as an adapter that can be mounted in the field to a conventional connection interface. For example, FIG. 4A is an illustration of a terminal connection device that is configured as an adapter 13 with an electrically isolated section of conductive or semiconductive material forming an electrode of a sensing capacitor of a capacitive voltage sensor. In the alternative example of FIG. 4B, an adapter 13' is provided where a capacitive element of the capacitive voltage sensor is located remotely from the electrically isolated section of conductive or semiconductive material.

FIG. 4A is an illustration of an exploded assembly including power cable 40, power cable connector 50, cable adapter 13 and a separable connector such as T-body 60. In this aspect the separable connector is configured as T-body 60, but in alternative aspects, the separable connector can be configured as an elbow, a connection interface which can be, for example, a lug 16, a separable connector, a splice, a modular connector, and other connection interfaces such as described herein. Adapter 13 is similar to terminal connection device 10, except that adapter 13 does not include a pre-mounted connection interface, but is instead configured to connect a connection interface to a cable, such as cable 40. Like terminal connection device 10, adapter 13 may include an electrically isolated section of conductive or semiconductive material forming an electrode of a sensing capacitor of a capacitive voltage sensor. In an alternative aspect, the adapter described herein does not require an electrically isolated section of conductive or semiconductive material forming an electrode of a sensing capacitor. Features of adapter 13 that are numbered the same as the corresponding features of terminal connection device 10 may be considered to be functionally similar. For brevity, these features are discussed in limited or no detail with respect to adapter 13.

Within the assembly of FIG. 4A, conductive male connector 50 is mounted to the end of cable conductor 42 to facilitate an electrical connection between cable conductor 42 of power cable 40 and inner conductor 12 of adapter 13.

Figure 6:
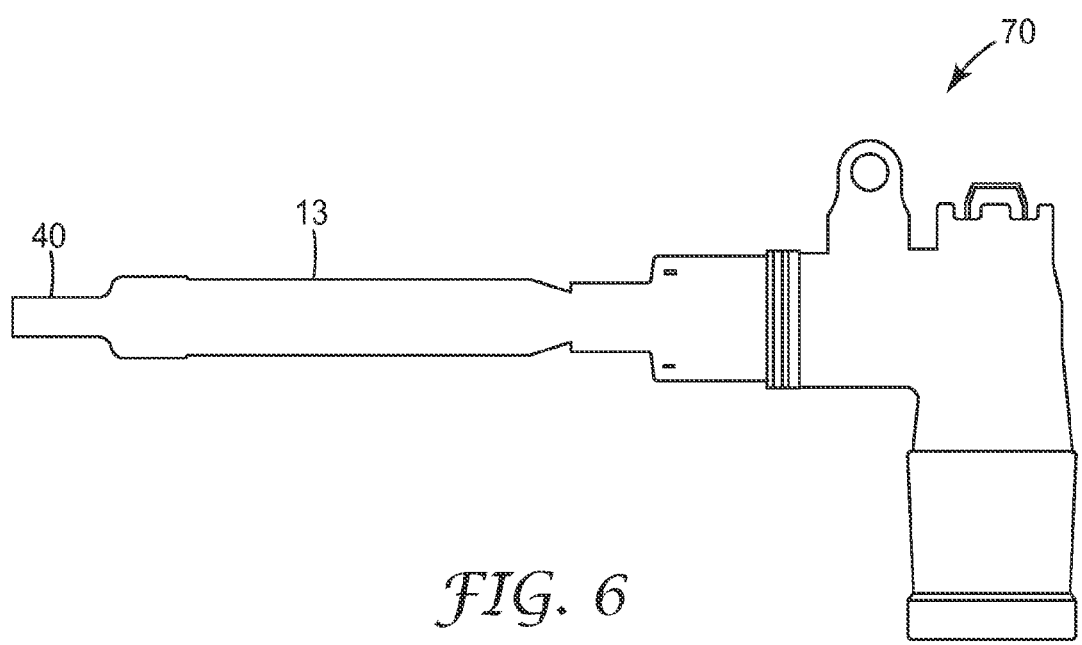
FIG. 6 is an illustration of an assembly including the adapter of FIG. 4 installed on various terminal connections including an elbow.

Adapter 13 is installed on the end of power cable 40. Adapter 13 includes inner conductor 12. A first end of inner conductor 12 can be formed as a connector, such as a female connector. In alternative aspects, the first end of inner conductor 12 can be formed as a male or hybrid type connector. The female connector 14 of inner conductor 12 is configured to mate to male end of power cable connector 50 to facilitate an electrical connection to cable conductor 42 of power cable 40. A second end of the inner conductor extends beyond insulating layer 20 and outer conductive or semiconductive layer 22. The second end of the inner conductor is mateable with a connection interface, such as one or more of a lug, a termination, and a separable connector, such as T body 60. Other suitable connection interfaces that may be used in place of T body 60 include a loadbreak elbow connector, a straight plug, a straight plug receptacle, a multi-way junction, a loadbreak reducing tap plug elbow, an injection port elbow, a feed-thru parking bushing, a feed-thru bushing insert, a deadbreak reducing plug elbow, a connecting plug elbow, a connecting plug and a bushing insert. For reference, one example elbow is elbow 70, which is illustrated in an assembly with cable 40 and adapter 13 in FIG. 6.

Adapter 13 may further include a multi-layer body 19 having an insulating layer 20, which concentrically surrounds inner conductor 12 and extends beyond a first end of inner conductor 12 to form part of a shrinkable sleeve expanded on a removable support core. The expanded portion forms a hollow interior section 21 adjacent to the first end of inner conductor 12. The hollow interior section 21 is configured to receive connector 50 and the end of power cable 40. In some examples, insulating layer 20 may include a shrinkable sleeve that forms hollow interior section 21. The multi-layer body 19 of terminal connection device 11 may also include inner conductive or semiconductive layer 18 disposed between inner conductor 12 and insulating layer 20 and disposed over at least a portion of an inserted power cable connector 50. Inner conductive or semiconductive layer 18 functions to eliminate or reduce the potential for voids between inner conductor 12 and insulating layer 20 that might allow leakage leading to degradation of insulating layer 20. The multi-layer body 19 of the terminal connection device 11 is configured to surround (or contact, when in an un-expanded state) the first end of the inner conductor. In addition, the multi-layer body 19 of the terminal connection device 11 is configured to extend towards the second end of the inner conductor 12, which is left exposed. In alternative aspects, hollow interior section 21 may be formed as a heat shrinkable or a push-on type adapter.

Adapter 13 can further include capacitive voltage sensor 32. As discussed with respect to FIG. 1, capacitive voltage sensor 32 includes an electrically isolated section of conductive or semiconductive material, non-conductive axial sections, a capacitive element, such as a PCB, and a sensor insulation layer. As also discussed with respect to FIG. 1, outer conductive or semiconductive layer 22 surrounds insulating layer 20 and may combine with an outer sensor conductive or semiconductive layer to substantially encapsulate capacitive voltage sensor 32.

Adapter 13 can further include current sensor 34. Current sensor 34 is configured to measure an electrical current within cable conductor 42 and/or inner conductor 12. Because adapter 13 includes both current sensor 34 and capacitive voltage sensor 32, adapter 13 facilitates calculation of phase angle (power factor), Volt Amps (VA), Volt Amps reactive (VAr), and Watts (W). In alternative aspects, adapter 13 can omit either or both of capacitive voltage sensor 32 and current sensor 34.

Figure 4B:
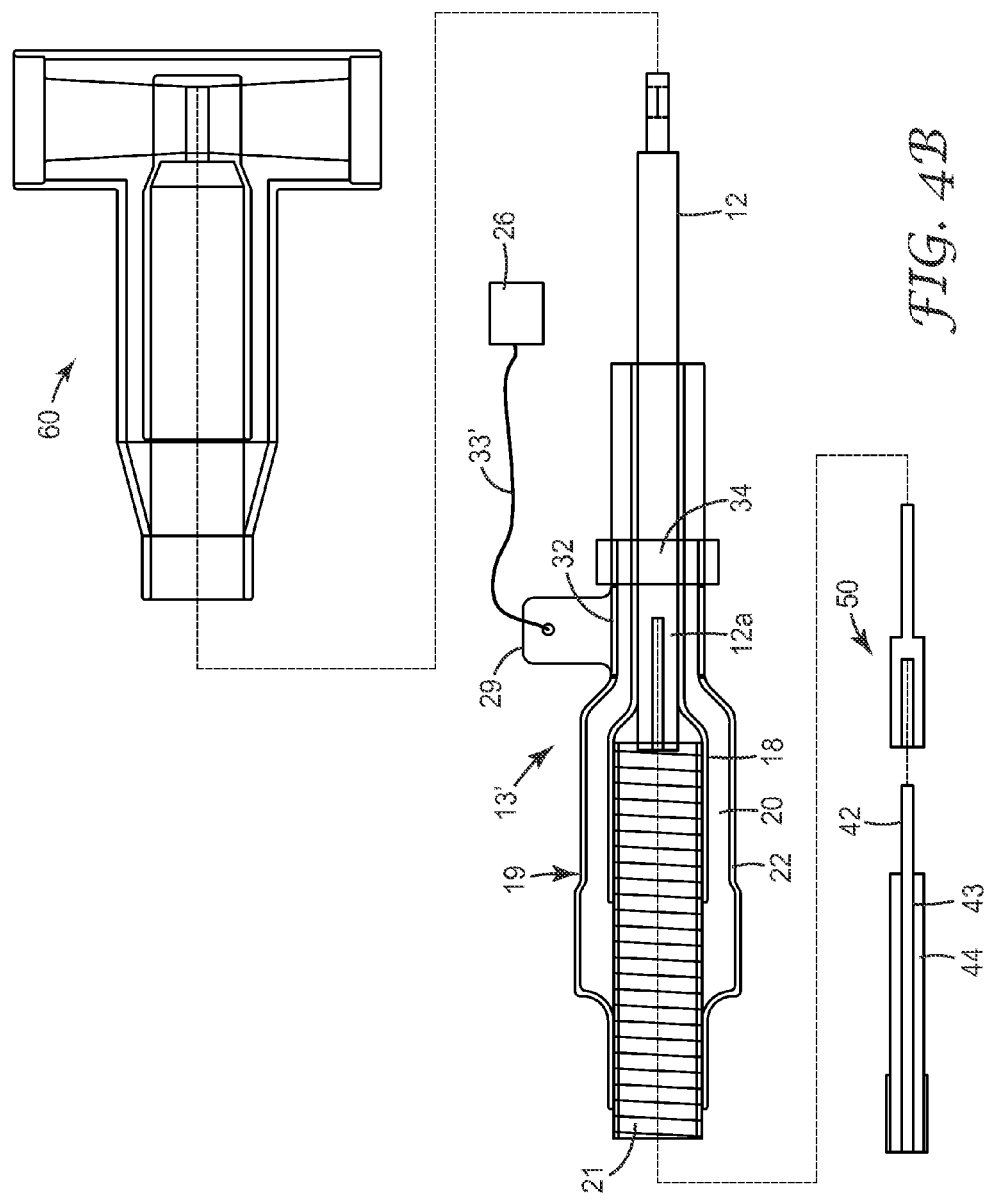
FIG. 4B is an illustration of a terminal connection device that includes an adapter with an electrically isolated section of conductive or semiconductive material forming an electrode of a sensing capacitor of a capacitive voltage sensor.

FIG. 4B shows an alternative adapter 13' that includes a current sensor having a remotely located capacitive element, here PCB 26. FIG. 4B is an illustration of an exploded assembly including power cable 40, connector 50, cable adapter 13' and a separable connector such as T-body 60. In this aspect the separable connector is configured as T-body 60, but in alternative aspects, the separable connector can be configured as an elbow. Alternatively, adapter 13' can be connected to another connection interface, such as a lug 16, a splice, a modular connector, and other connection interfaces such as described herein. Adapter 13' is similar to adapter 13, except that adapter 13' includes a tab 29 that electrically connects the capacitive sensor 32 with a remotely located capacitive element, such as a capacitor, circuitry, or PCB 26', or a combination thereof, via wire 33'. For example, PCB 26 can be located in a remote terminal unit that processes current and or voltage data from the adapter/terminal connection device. Features of adapter 13' that are numbered the same as the corresponding features of adapter 13 may be considered to be functionally similar. For brevity, these features are discussed in limited or no detail with respect to adapter 13'.

In the aspect of FIG. 4B, the capacitive sensor 32 of adapter 13' can be radially expanded or contracted without adversely affecting the capacitor electrode spacing to a significant degree. The tab will be formed from similar materials as the outer conductive or semiconductive layer.

Adapters 13, 13' are modular, retrofittable, and compatible with variety of customer accessories. As such, adapters 13, 13' are suitable for field repair operations. The adapters are retrofittable on existing power cables, where the user can remove the existing cable accessory (e.g., separable connector, termination, other connection interface, etc.) and replace the removed accessory with the same or a different connection interface. The adapters 13, 13' are also configured to be suitable for use in space restricted areas. The adapters 13, 13' are also compatible with a range of sizes of cable, especially when including a cold shrinkable sleeve portion.

Figure 5:
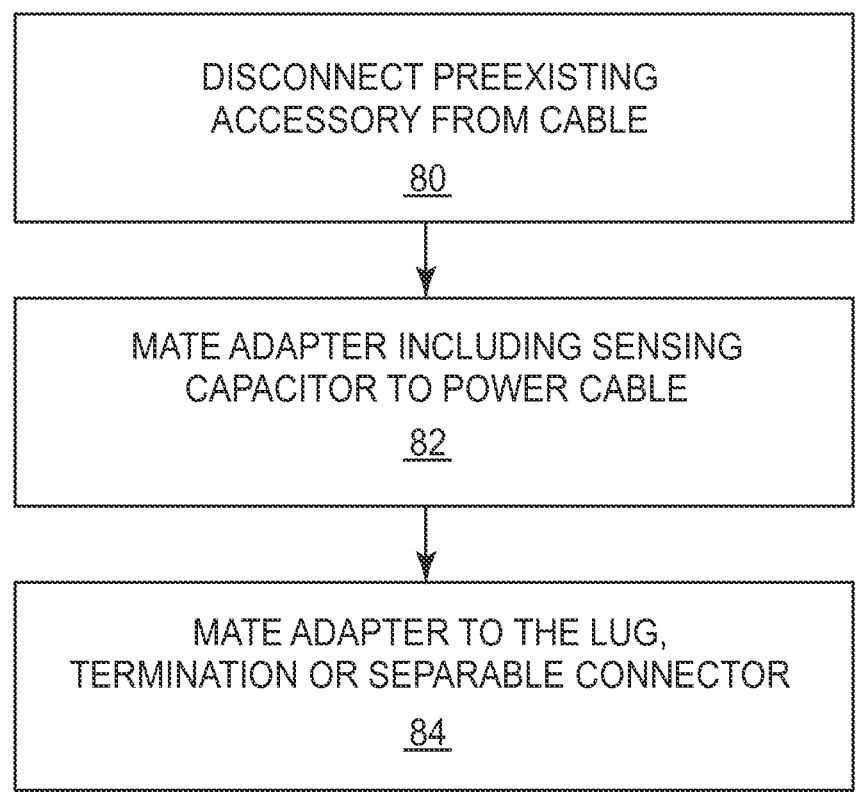
FIG. 5 is a flowchart illustrating steps for retrofitting a power cable with a terminal connection device or an adapter including a capacitive voltage sensor.

FIG. 5 is a flowchart illustrating one example process for installing or retrofitting an existing power cable with a terminal connection device or an adapter such as those described herein. For clarity, the techniques illustrated in FIG. 5 are described with respect to adapter 13 of FIG. 4A.

In a first step, a preexisting cable accessory is disconnected from the preexisting power cable 40 (80). Examples of types of cable accessories include a T body, a loadbreak elbow connector, a straight plug, a straight plug receptacle, a multi-way junction, a loadbreak reducing tap plug elbow, an injection port elbow, a feed-thru parking bushing, a feed-thru bushing insert, a deadbreak reducing plug elbow, a connecting plug elbow, a connecting plug and a bushing insert. Disconnecting the preexisting cable adapter from cable 40 may include cutting cable 40. Thus, cable 40 may be shortened somewhat during the removal of the preexisting cable adapter. The cable 40 can be prepared for connection in a conventional manner.

Once the preexisting cable accessory is disconnected from cable 40, cable adapter 13 is mated to the end of the cable 40 (82). In some examples, a power cable connector 50 may first be installed on the end of cable conductor 42 before cable adapter 13 is mated to the end of cable 40. Then, the second end of cable adapter 13 is mated to the preexisting connection interface, where the connection interface can be, for example, a lug, termination, or separable connector, such as T body 60 (84). Alternatively, the cable adapter can be mounted into a new connection interface, which can be the same as or different from the preexisting cable interface or accessory. The connection interface can be connected to the electrical installation of the power grid or network.

In some examples, a sensor wire from a flexible circuit of capacitive voltage sensor 32 may be connected to a computing device to facilitate receiving signals from the flexible circuit representing voltages sensed by capacitive voltage sensor 32.

Although specific embodiments have been illustrated and described herein for purposes of description of the preferred embodiment, it will be appreciated by those of ordinary skill in the art that a wide variety of alternate or equivalent implementations may be substituted for the specific embodiments shown and described without departing from the scope of the present invention. Those with skill in the art will readily appreciate that the present invention may be implemented in a very wide variety of embodiments. This application is intended to cover any adaptations or variations of the embodiments discussed herein.

What is claimed is:

1. A terminal connection device for a power cable comprising:
    an inner conductor;
    a contiguous body disposed onto the inner conductor and comprising:
        an insulating layer surrounding the inner conductor and extending beyond a first end of the inner conductor to form a hollow interior section adjacent to the end of the inner conductor;
        an outer conductive or semiconductive layer adjacent to and surrounding the insulating layer; and
        an electrically isolated section of conductive or semiconductive material in contact with an outer surface of the insulating layer,
    wherein the terminal connection device is configured to receive an end of a cable conductor of the power cable such that the end of cable conductor of the power cable fits within the hollow interior section and electrically connects to the first end of the inner conductor;
    wherein the electrically isolated section of conductive or semiconductive material forms an electrode of a sensing capacitor of a capacitive voltage sensor;
    wherein the insulating layer is operable to form a dielectric of the sensing capacitor of the capacitive voltage sensor, and
    wherein the capacitive voltage sensor further includes a flexible printed circuit board (PCB) in electrical contact with the electrically isolated section of conductive or semiconductive material.

2. The terminal connection device of claim 1, further comprising an inner conductive or semiconductive layer between the inner conductor and the insulating layer, the inner conductive or semiconductive layer being adjacent to the insulating layer and the inner conductor;
    wherein the inner conductive or semiconductive layer is an overmolded inner conductive or semiconductive layer overmolded on the inner conductor, and
    wherein the insulating layer is an overmolded insulating layer overmolded on the inner conductive or semiconductive layer.

3. The terminal connection device of claim 2, wherein the outer conductive or semiconductive layer is an overmolded outer conductive or semiconductive layer overmolded on the insulating layer.

4. The terminal connection device of claim 1, wherein the insulating layer has a substantially consistent thickness.

5. The terminal connection device of claim 1, wherein the inner conductor comprises one of a solid inner conductor and a stranded wire inner conductor.

6. The terminal connection device of claim 1, wherein the outer conductive or semiconductive layer is discontinuous at two longitudinal positions to form the electrically isolated section of conductive or semiconductive material in an annular ring configuration.

7. The terminal connection device of claim 1, further comprising a non-conductive material located between the electrically isolated section of conductive or semiconductive material and the remainder of the outer conductive or semiconductive layer.

8. The terminal connection device of claim 1, wherein the capacitive voltage sensor comprises a conductive element in electrical contact with the electrically isolated section of conductive or semiconductive material to facilitate measuring a voltage potential of the electrically isolated section of conductive or semiconductive material.

9. The terminal connection device of claim 1, further comprising a current sensor configured to measure an electrical current within the cable conductor or the inner conductor.

10. The terminal connection device of claim 1, wherein the terminal connection device further comprises one of a lug and a connection interface integral with a second end of the inner conductor.

11. The terminal connection device of claim 1, wherein the insulating layer is formed as at least part of a shrinkable sleeve that forms the hollow interior section, wherein the shrinkable sleeve is radially contractible to positively engage the end of the cable conductor of the power cable within the hollow interior section.

12. An adapter for a medium or high voltage power cable connection, comprising:
an inner conductor having a first end and a second end;
a contiguous body disposed onto the inner conductor and comprising:
an insulating layer surrounding the inner conductor and extending beyond the first end of the inner conductor to form a hollow interior section adjacent to the first end of the inner conductor;
an outer conductive or semiconductive layer adjacent to and surrounding the insulating layer; and
an electrically isolated section of conductive or semiconductive material in contact with an outer surface of the insulating layer,
wherein the adapter is configured to receive an end of a cable conductor of a power cable such that the end of the cable conductor of the power cable fits within the hollow interior section and electrically connects to the first end of the inner conductor,
wherein the second end of the inner conductor extends beyond the insulating layer and the outer conductive or semiconductive layer, wherein the second end of the inner conductor opposes the first end of the inner conductor, and wherein the second end of the inner conductor is mateable with a connection interface,
wherein the electrically isolated section of conductive or semiconductive material forms an electrode of a sensing capacitor of a capacitive voltage sensor, and
wherein the capacitive voltage sensor further includes a flexible printed circuit board (PCB) in electrical contact with the electrically isolated section of conductive or semiconductive material.

13. The adapter of claim 12, further comprising an inner conductive or semiconductive layer between the inner conductor and the insulating layer, the inner conductive or semiconductive layer being adjacent to the insulating layer and the inner conductor;
wherein the inner conductive or semiconductive layer comprises an overmolded inner conductive or semiconductive layer overmolded on the inner conductor, and
wherein the insulating layer comprises an overmolded insulating layer overmolded on the inner conductive or semiconductive layer.

14. The adapter of claim 12, wherein the adapter is configured to receive the end of the cable conductor of the power cable when the end of the cable conductor of the power cable is engaged with a power cable connector, wherein the power cable connector is configured to be received in the hollow interior section formed by the insulating layer.

15. An assembly comprising:
a power cable including:
a cable conductor extending along a length of the power cable,
a cable insulating layer surrounding the cable conductor except a portion of the cable conductor that protrudes from the cable insulating layer at an end portion of the power cable,
an inner cable semiconductor or conductor layer between the cable conductor and the cable insulating layer, the inner cable semiconductor or conductor layer being adjacent to the cable insulating layer, and
an outer cable semiconductor or conductor layer adjacent to and surrounding the cable insulating layer; and
the terminal connection device of claim 1, wherein the terminal connection device is secured to the end portion of the power cable.

16. The assembly of claim 15, wherein the second end of the inner conductor is integral with a connection interface selected from one of the set consisting of:
a loadbreak elbow connector;
a T connector;
a straight plug;
a straight plug receptacle;
a multi-way junction;
a loadbreak reducing tap plug elbow;
an injection port elbow;
a feed-thru parking bushing;
a feed-thru bushing insert;
a deadbreak reducing plug elbow;
a connecting plug elbow;
a connecting plug;
a cable adapter; and
a bushing insert.

* * * * *